(12) United States Patent
Breu et al.

(10) Patent No.: US 6,187,362 B1
(45) Date of Patent: Feb. 13, 2001

(54) PROCESS FOR PRODUCING HELICAL OR SPIRAL SAUSAGES

(75) Inventors: Andreas Breu, Furth im Wald; Hubert Kott, Eschlkam, both of (DE)

(73) Assignee: Breuko GmbH Fleish-und Wurstwarenvertrieb, Furth im Wald (DE)

( * ) Notice: Under 35 U.S.C. 154(b), the term of this patent shall be extended for 0 days.

(21) Appl. No.: 09/324,513

(22) Filed: Jun. 3, 1999

(30) Foreign Application Priority Data

Feb. 8, 1999 (DE) ............................................... 299 02 102

(51) Int. Cl.⁷ ...................................................... A23L 1/317
(52) U.S. Cl. .......................... 426/513; 426/516; 426/517
(58) Field of Search ..................................... 426/646, 511, 426/513, 516, 517, 520, 284; 452/51

(56) References Cited

U.S. PATENT DOCUMENTS

| 3,180,737 | * | 4/1965 | Culp | 426/513 X |
| 3,615,686 | * | 10/1971 | Marshall | 426/513 X |
| 4,058,633 | * | 11/1977 | Staff et al. | 426/513 X |
| 4,379,356 | * | 4/1983 | Geissbuhler | 426/513 |
| 4,778,686 | * | 10/1988 | Chauvin | 426/513 X |
| 5,118,519 | * | 6/1992 | Mally et al. | 426/513 |
| 5,236,731 | * | 8/1993 | Becker | 426/513 |

FOREIGN PATENT DOCUMENTS

| 64-80262 | * | 3/1989 | (JP) | 426/284 |
| 1-98461 | * | 4/1989 | (JP) | 426/284 |

* cited by examiner

Primary Examiner—Arthur L. Corbin
(74) Attorney, Agent, or Firm—Hoffman, Wasson & Gitler, PC

(57) ABSTRACT

The invention relates to a casingless sausage in a spiral or helical form and to a process and a device for producing a casingless sausage.

9 Claims, 4 Drawing Sheets

PROCESS FOR PRODUCING HELICAL OR SPIRAL SAUSAGES

BACKGROUND OF THE INVENTION

The invention relates to a sausage, which can be grilled or fried, and more particularly to a sausage making device for sausages made from a meat or protein mixture and a process for producing a sausage containing a protein and/or meat-containing mixture.

Frying or grilling sausages of the most varied type are known. It is also known to grill sausages in a helical or spiral form. A long sausage with an outer sausage skin, which is formed by a natural or artificial casing, is coiled into a spiral or helix, and is then fixed by spits.

The object of the invention is to devise an alternative to classical sausages, especially to classical frying or grilling sausages.

SUMMARY OF THE INVENTION

To achieve this object a sausage is formed. The sausage as claimed in the invention is made without a casing, i.e. the outer sausage skin which holds the sausage meat together consists neither of a natural casing nor of an artificial casing, but is produced by the sausage meat itself by modification of this meat by boiling or heating. The sausage as claimed in the invention is preferably a frying or grilling sausage.

An object of the invention is also to provide a sausage making device with which sausages can be produced in the most varied forms in a simple manner and also with high output. To achieve this object a sausage making device with at least one delivery opening located a deposition site for producing a strand of sausage from a sausage mixture and means for motorized generation of relative motion between the delivery opening and the deposition site.

In the simplest case, in the sausage making device as claimed in the invention there is relative motion between the delivery opening and a deposition site, i.e. for example the deposition site is moved relative to the delivery opening or the delivery opening relative to the deposition site. Of course more complex movements are possible, especially movements of the delivery opening in several axial directions, optionally with simultaneous movement of the deposition site, etc.

In one possible embodiment, at least one delivery opening is formed by a delivery nozzle which is provided on an extruder-like sausage machine, or the delivery opening is formed by a shaped gap between two rollers which move in opposite direction.

The process of producing the sausage includes a heat treatment of the sausage mixture, wherein a strand of sausage is formed into a helix or spiral turn which adjoin one another or which touch one another, and the individual turns are connected to one another by modification of the sausage mixture.

BRIEF DESCRIPTION OF THE DRAWINGS

The invention is detailed below using the following figures.

DETAILED DESCRIPTION OF THE INVENTION

Figure 2:
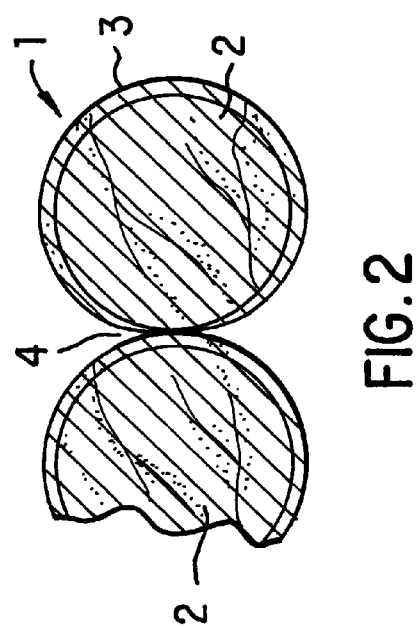
FIG. 2 shows a section according to line I—I of FIG. 1.

In the figures a frying or grilling sausage which has been produced without a casing from a meat-based sausage mixture is labelled 1. For the purposes of the invention casingless means that the outer covering or skin 3 of the sausage 1 is not formed either by a natural casing or an artificial casing, but this outer skin 3 is produced from the sausage mixture 2 by its corresponding modification, i.e. by boiling in hot or boiling water or in steam, especially the protein of the mixture 2 on the outside of the sausage 1 forming the skin 3 which holds the sausage or the mixture together. To produce the mixture the types of meat conventionally used for frying or grilling sausages, for example beef and pork, are suited. Furthermore, the mixture 2 contains the conventional additives and spices.

The grilling sausage 1 is made helical or spiral-shaped, i.e. it is an elongated sausage strand which is rolled together into the helix, the connection 4 between adjacent turns of the helix are produced by the modification of the mixture 2 which forms the skin 3, i.e. by heating in hot or boiling water and/or in steam. Preferably, the helical grilling sausage 1 is produced such that the sausage strand is extruded with suitable auxiliary means and formed into a helix on a base, whereupon boiling to form the skin 3 and the connection 4 between the individual turns of the helix takes place.

Figure 1:
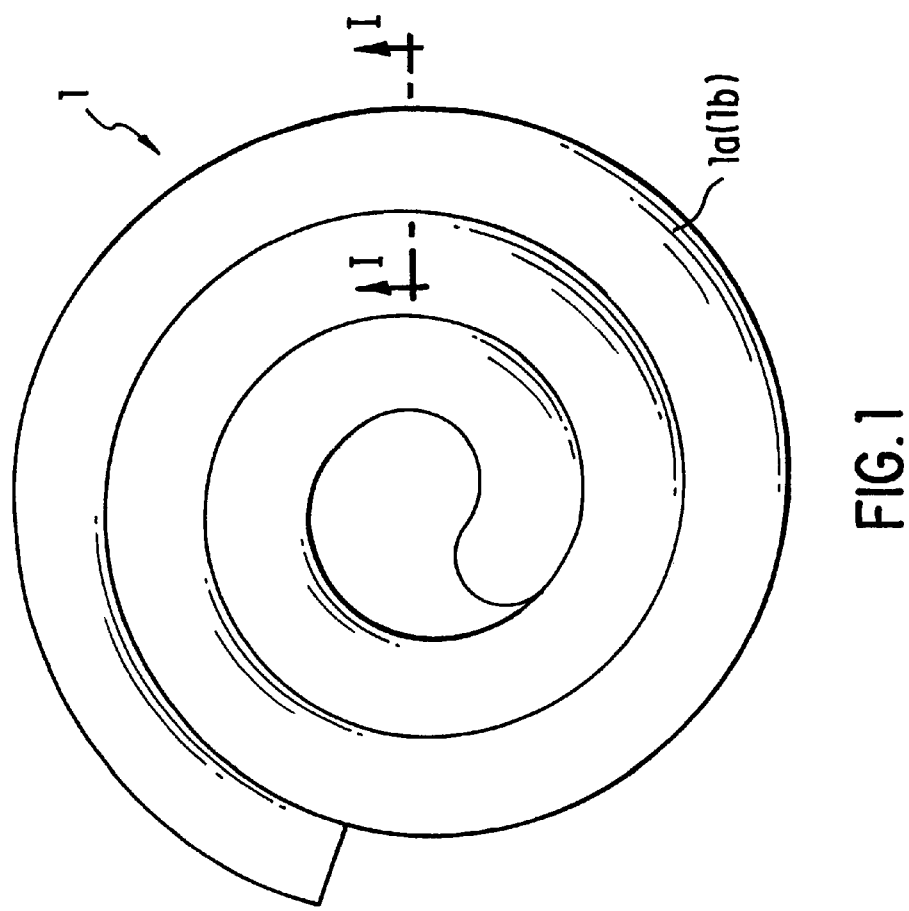
FIG. 1 shows in a simplified representation and in an overhead view a casingless grilling or frying sausage in the form of a helix.
Figure 3:
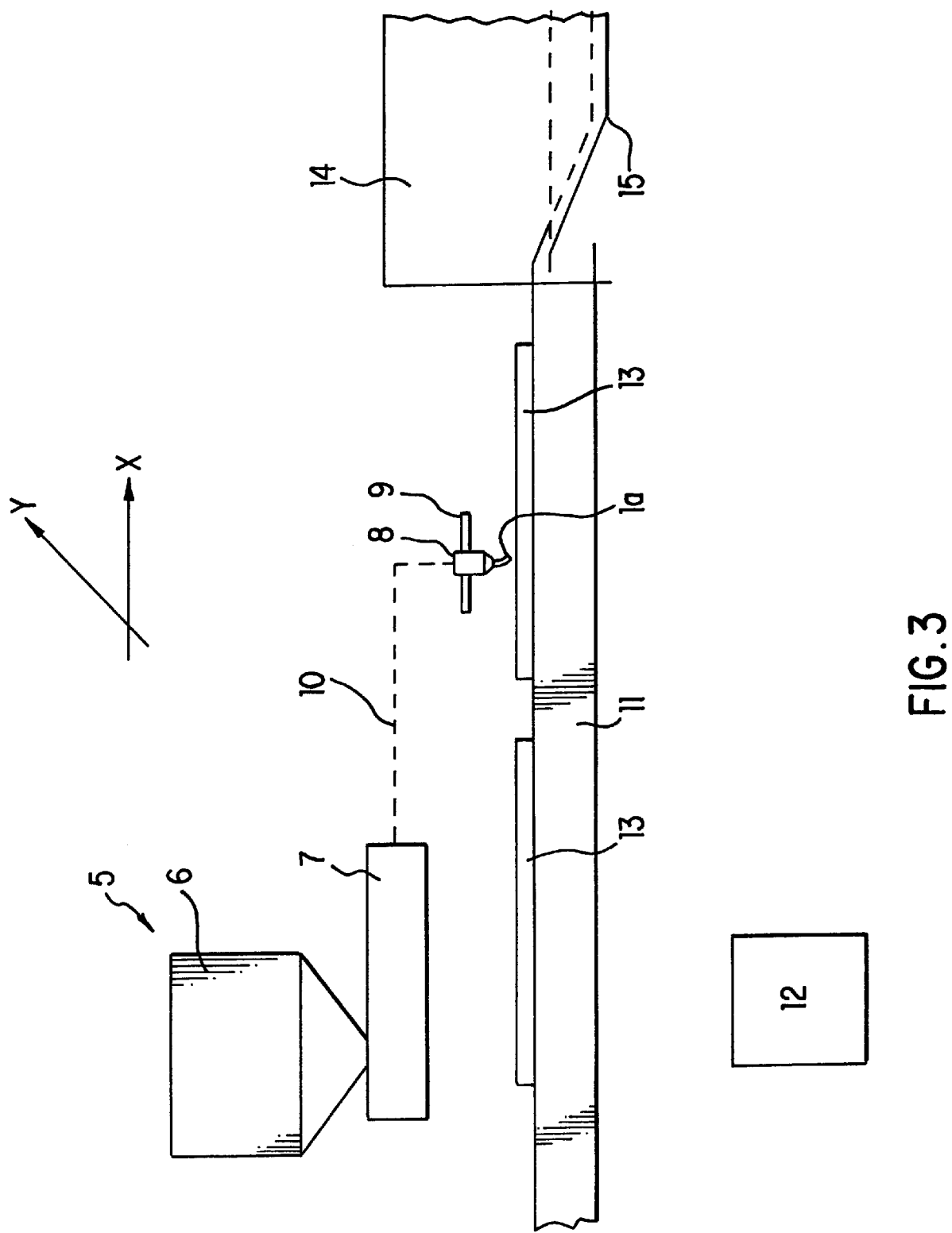
FIG. 3 shows in a simplified schematic representation a device for producing casingless sausage as claimed in the invention.

FIG. 3 shows a sausage making device for forming the sausage mixture or meat 2 without a casing, i.e. for producing casingless sausages. The device 5 is suitable among others for producing the grilling sausage from FIGS. 1 and 2. The device 5 however can also be used to produce other types and/or shapes of sausage.

The device 5 includes of a feed funnel 6 for adding the sausage mixture (for example, the raw sausage meat). The feed funnel 6 forms the inlet to the extruder 7 which has, for example, a conveyor section, and which has an outlet which is formed in this embodiment by a nozzle 8 which can be moved by means of a carriage arrangement 9 in one horizontal plane in the two axes X and Y. The nozzle 8 is connected to the extruder 7 via a flexible delivery pipe 10 and with its nozzle or delivery opening pointed down it lies somewhat above a transporter 11 which, for example, is formed by a continuously turning driven conveyor belt. By means of an electrical control means 12, the carriage arrangement 9, or its drive, can be controlled according to a preselected or input program (for example, CNC-controlled). In the embodiment shown, the control means 12 also controls the drive of the extruder 7 and thus the output of this extruder and the drive of the transporter 11, i.e. turning the transporter 11 and/or its speed on and off, such that the strand 1a of sausage extruded from the nozzle 8 on the transporter 11 or on the bases 13, which are provided there, and which are for example sheets, forms the desired shape of sausage, for example the helically rolled grilling sausage of FIGS. 1 and 2, pretzel-shaped sausages, sausage patties, straight sausages, etc.

On the discharge nozzle 8, there is preferably a cutting device which is not shown, which is controlled by the control means 12, and which then cuts the extruded sausage strand directly on the nozzle 8 and temporarily stops the extrusion process when a sausage has been completely formed.

The formed strand of sausage 1a, or the sausage, then travels on the transporter 11, or on the supports 13, to form the skin 2 in a boiling tunnel 14, in which the sausages 1a are routed through at least one bath 15 with hot or boiling water. Subsequently the sausages, which have been produced, are subjected to additional processing steps depending on the type of sausage, for example smoking, curing, drying, cooling, etc. By control of the motion of the nozzle 8, by the control means 12, the most varied forms for casingless sausages can be produced in the same machine in an extremely simple manner.

Figure 4:
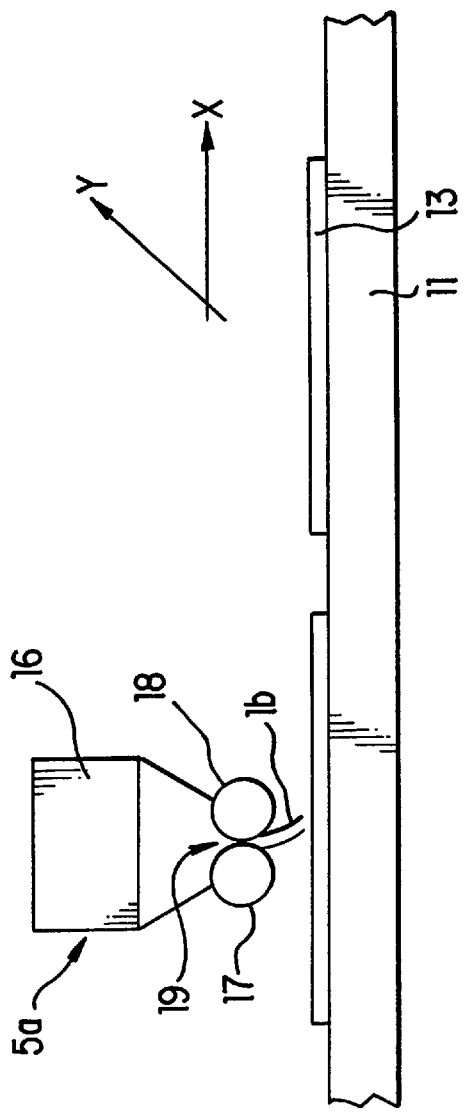
FIG. 4 shows in a simplified schematic representation another device for producing casingless sausage as claimed in the invention.
Figure 5:
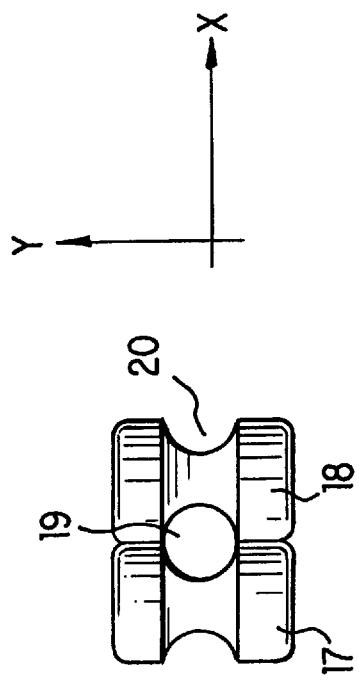
FIG. 5 shows in a simplified representation and in an overhead view two rollers of the device from FIG. 4.

FIG. 4 shows in a very simple representation, as another possible embodiment, a device 5a for producing casingless sausages. In this device 5a there is a delivery funnel 16 with its delivery opening above the transporter 11. The delivery opening of the delivery funnel 16 is formed by two rollers 17 and 18 which are driven in opposite directions, such that the two rollers roll away from one another in the area of a shaped gap 19 which is formed between these rollers. In this embodiment, the shaped gap 19, according to FIG. 5, is formed by the rollers having in the middle a groove 20 which is open towards the periphery of the rollers and which concentrically surrounds the roller axis, the two grooves forming the shaped gap 19.

The delivery funnel 16 is located for example rigidly over the transporter 11 such that continuous, or cut sausage strands 1b, which are oriented with their longitudinal extension in the transport direction of the transporter 11, are deposited on this transporter 11, or on bases 13 which are located there. It is also possible to make the feed funnel 16 movable at least in one axial direction transversely to the transport direction of the transporter, i.e. in the Y axis, so that with consideration of the motion of the transporter 11 in the Y-axis, the sausage strand lb can be deposited in the most varied forms on the transporter 11, or on the bases 13 located there.

Figure 6:
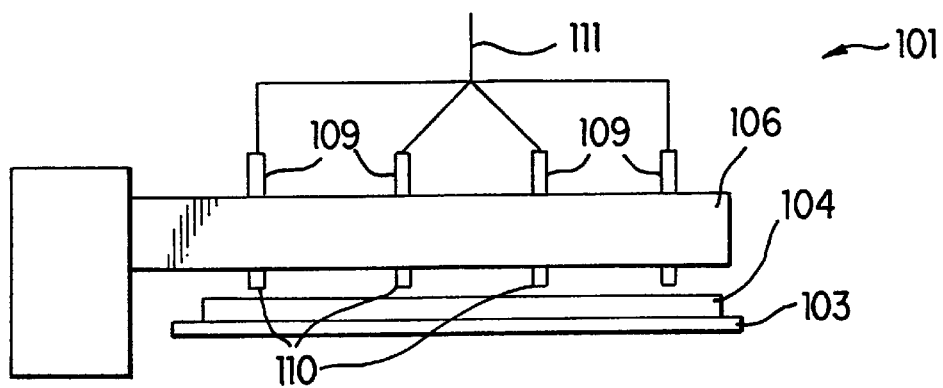
FIG. 6 shows in a simplified representation and in a side view one device as claimed in the invention.
Figure 7:
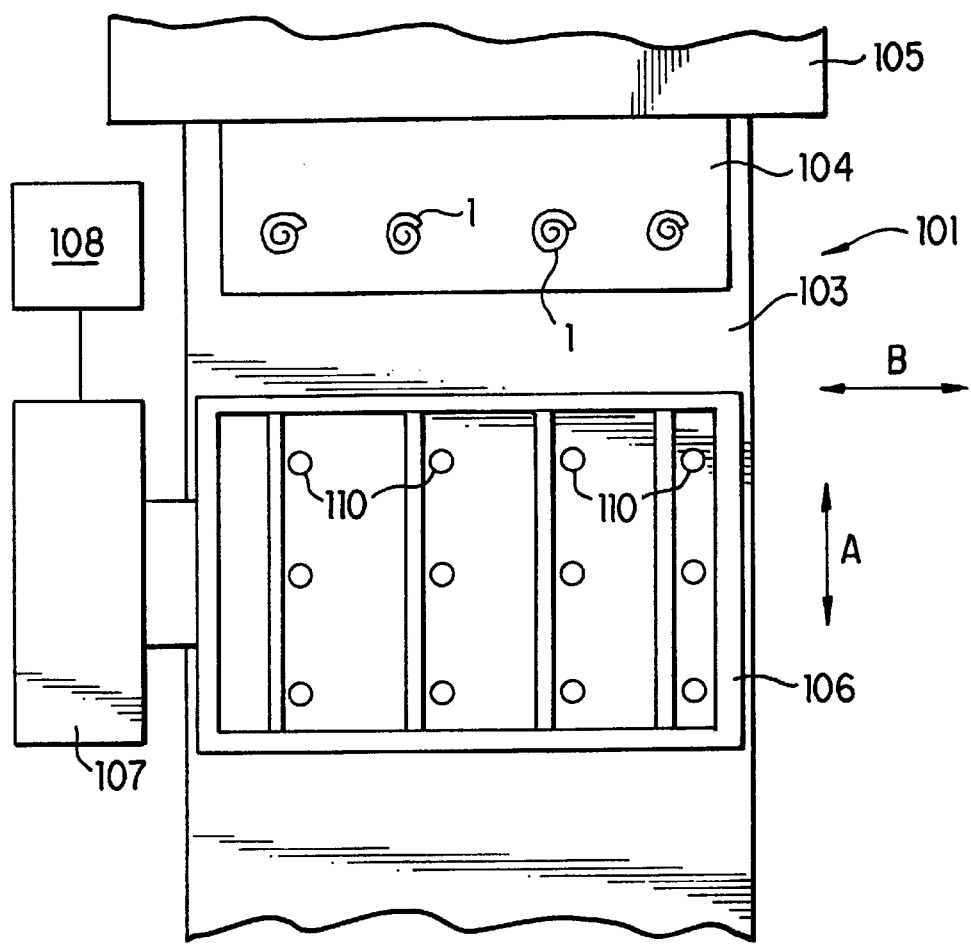
FIG. 7 shows an overhead view of the device of FIG. 6.

The device which is generally labelled 101 and which is shown schematically in FIGS. 6 and 7 is used to produce or form sausages 1 in a spiral or helical shape. The sausages are formed from a protein-containing sausage mixture by extrusion without a casing. A length of the sausage strand is made spiral or helical, and then is subjected to heat treatment, for example by steam, to form its own skin by modification of the sausage mixture on the outer surface thereof and at the same time for connecting the turns of the spiral or helical shape, i.e. for fixing this form.

The sausage making device 101 consists of a transporter 103, formed by a belt, or other suitable element, which forms an upper horizontal support for the sheets 104, or other suitable deposition sites, on which a plurality of sausages 1 can be formed. These sausages 1 are then moved through a heat treatment station labelled in general 105 in FIG. 7, by continued movement of the transporter 103.

Over the transport plane of the transporter 103, there is a carrier 106 at a distance from and essentially parallel to the horizontal top of the transporter 103, and thus also with a certain distance over the respective sheet 104. The carrier 106, which in the embodiment shown is made as a frame, can be moved in an oscillating manner by a drive 107, according to the double arrow A in the transport direction of the transporter 103 and against this transport direction and according to the double arrow B in the horizontal direction, and transversely to the conveyor direction of the transporter 103, controlled by an electronic control means 108, or by a program filed in this means.

Several hoses 109, each with one open end, are attached on the carrier 106 such that each open end 110, is opposite the top of the transporter 103, with the axis of its opening perpendicular, or roughly perpendicular, to the top of the transporter 103, and with a certain distance from this top, or from the top of the sheets 104, located on the transporter 103. In the embodiment shown, the hoses 109 are located with their ends on the carrier 106, such that transversely to the conveyor direction of the transport 103 they form several groups. In the embodiment shown, a total of four groups, each group in the embodiment shown having a total of three hoses or hose ends 110, which are located in each group in the conveyor direction of the transporter 103. In the embodiment shown, there are a total of 12 hoses 109, or hose ends 110, on the carrier 106. The hoses 110 are each connected to the output 111 of a sausage machine, which is not shown, and which delivers the sausage mixture at a certain pressure to the hoses 109 so that this sausage mixture then emerges at each hose end 110, and can be deposited as a strand of sausage on a sheet 104, which is located under the carrier 106. During this deposition, the carrier 106 is moved by the drive 107 such that each deposited sausage strand forms a helical or spiral-shaped sausage 1.

Thus, in one step, several sausages 1, i.e. in the embodiment shown, a total of twelve sausages, can be formed on the sheet 104 prepared at the time. It goes without saying that the number of rows and groups of the hose ends 110 and the number of hoses 109 can be much greater. This depends on the size of the sheets 104 which have been used so that in one process the entire sheet 104 is occupied by sausages 1.

It also goes without saying that the sausage machine is intermittently controlled, i.e. after forming the sausages 1, on a sheet 104, further supply of the sausage mixture to the hoses 109 is interrupted until a new sheet 104 has been moved with the transporter 103 to under the carrier 106. Furthermore, it goes without saying that the transporter 103 is actuated intermittently or clocked, i.e. the transporter 103 is turned off during forming of the sausages 1. As soon as the process has been completed, i.e. the sausages 1 have been deposited in spiral or helical form on the respective sheet 104, the transporter 103 is turned on and moved at least until a new sheet 104 is located under the carrier 106.

It is possible, for example, to provide the hose ends 110 on a carriage which is guided on the carrier or frame 106, for example, in the direction of the double arrow B and is moved by a drive, while the drive of the carrier 106 is moved in the horizontal axial direction which runs perpendicularly to this motion, for example, in the direction of the double arrow A. The two drives are then again controlled by the control means 108.

The invention was described above using embodiments. It goes without saying that numerous changes and modifications are possible without departing from the inventive idea underlying the invention. In the above described embodiments, it was assumed that there is only one delivery opening in the form of a delivery nozzle 8, or a shaped gap 19, on each of the devices 5 and 5a. Of course, to increase the output of the respective device, it is a good idea to provide several such delivery openings offset next to one another, for example against on another in the direction of the Y-axis, for example, perpendicularly or transversely to the direction of motion of the transporter 11.

REFERENCE NUMBER LIST 1 frying sausage
1a, 1b strand of sausage 2 sausage mixture or sausage meat
3 sausage skin
4 connecting area
5, 5a sausage making device
6 feed funnel
7 extruder
8 delivery nozzle
9 carriage arrangement
10 flexible delivery pipe
11 transporter
12 control means
13 base
14 boiling tunnel
15 bath
16 feed and delivery funnel
17, 18 roller
19 shaped gap
20 groove
101 device
103 transporter
104 sheet
105 heat treatment station
106 carrier
107 drive
108 control means
109 hose
110 hose end
111 sausage machine connection

What is claimed is:

1. A process for producing a helical or spiral shaped sausage, the sausage consisting of: a protein-containing sausage mixture, a meat-containing sausage mixture, or a blend thereof, and the sausage having a sausage skin which surrounds the mixture or blend thereof;

the process comprising modifying the sausage mixture, or blend thereof, by a heat or steam treatment to form a strand of sausage mixture, or blend thereof, into a helical or spiral shaped sausage with individual turns which adjoin one another or which touch one another, wherein a plurality of discharge openings are provided on a carrier for delivering the sausage mixture, or blend thereof, as a length of a sausage strand, and depositing the sausage strand on a deposition side located under the plurality of discharge openings on the carrier, and wherein the carrier is moving in at least two axial directions extending perpendicular to one another.

2. The process as claimed in claim 1, wherein the turns which adjoin one another of the helical or spiral shaped sausage are connected simultaneously with production of the sausage skin.

3. The process as claimed in claim 1, wherein the meat-containing sausage mixture is pork-containing or beef-containing.

4. The process as claimed in claim 1, wherein the modification of the sausage mixture, or blend thereof, takes place to form the sausage skins and connect the individual turns of the helical- or spiral-shaped sausage, and wherein the heat treatment, is selected from hot water or boiling water.

5. The process according to claim 1, wherein the plurality of discharge openings are located on the carrier in several groups, each group having at least one delivery opening.

6. The process according to claim 1, wherein the sausage strand is deposited on a deposition side of a transporter, on deposition elements or on sheets located thereon.

7. A process for producing a shaped sausage, the sausage consisting of a protein-containing sausage mixture, a meat-containing sausage mixture, or a blend thereof and having a sausage skin which surrounds the mixture or blend thereof; the process comprising modifying the sausage mixture, or blend thereof by a heat or steam treatment to form a strand of the sausage mixture, or blend thereof, having individual turns which adjoin one another or which touch one another, wherein a plurality of discharge openings are provided on a carrier for delivering the sausage mixture, or blend thereof, as a length of a sausage strand, and depositing the sausage strand on a deposition side located under the plurality of discharge openings on the carrier, and moving the carrier in at least two axial directions extending perpendicular to one another.

8. The process according to claim 7, wherein the plurality of discharge openings are located on the carrier in several groups, each group having at least one delivery opening.

9. The process according to claim 7, wherein the sausage strand is deposited on a deposition side of a transporter, on deposition elements or on sheets located thereon.

* * * * *